UNITED STATES PATENT OFFICE.

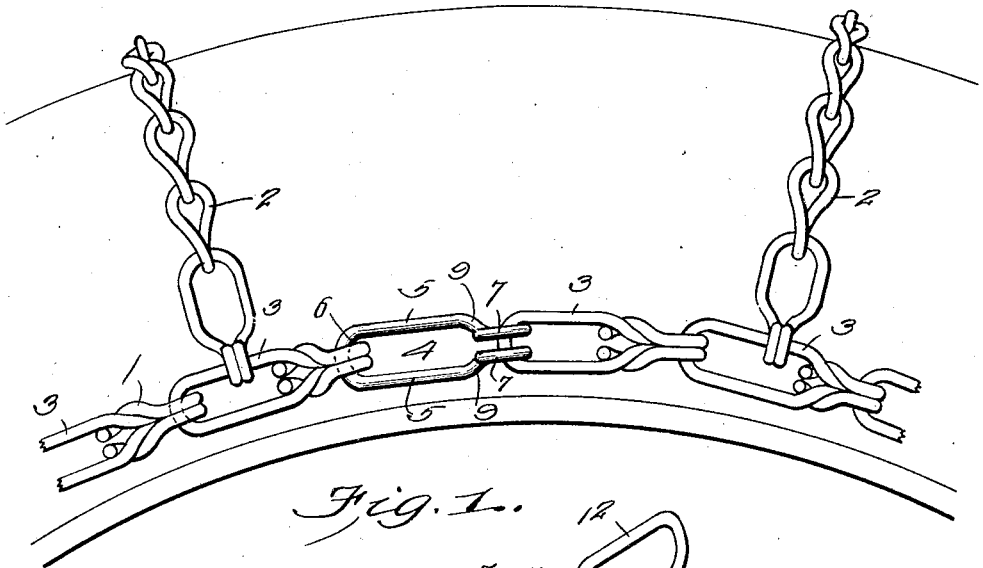

HARRY A. LENTZ, OF WASHINGTON, DISTRICT OF COLUMBIA.

EMERGENCY REPAIR-LINK.

1,332,559.  Specification of Letters Patent.  Patented Mar. 2, 1920.

Application filed March 11, 1919. Serial No. 281,991.

*To all whom it may concern:*

Be it known that I, HARRY A. LENTZ, a citizen of the United States, residing at Washington, in the District of Columbia, have invented certain new and useful Improvements in Emergency Repair-Links, of which the following is a specification.

This invention relates to certain new and useful improvements in emergency repair links designed for use in repairing broken links of anti-skid chains such as are generally employed in connection with automobile tires.

It is a well-known fact that the end links of tire-chains and the links to which the cross chains are attached are subject to unusual strain and constant wear and often soon become broken. The link forming the subject-matter of the present invention is designed to replace such broken side link, and is provided with ample space to accommodate the hooks on the cross chains.

Owing to the peculiar construction of the side chains, the links thereof cannot be opened and again closed to make repairs, and the ordinary repair link cannot be used without twisting the chain out of shape, and it is necessary to either discard the entire chain or make repairs by means of wire, which is a slow process and very unsatisfactory, as the strands soon break and the ends are liable to injure the side walls of the tire. My improved link slips into place and is easily clenched with a hammer, or a pair of pliers, or any other convenient means. Any number of links can be used without in any wise affecting the free movement of the entire chain. The clenched ends can be re-opened and re-clenched as often as desired, which is not possible with other forms of repair links. My improved link will not twist out of shape, and the hooks are so designed that, when clenched, it is impossible for them to open while the chain is being used.

Other objects and advantages of the invention will hereinafter appear and the novel features thereof will be particularly pointed out in the appended claims.

The invention is clearly illustrated in the accompanying drawing, which, with the numerals of reference marked thereon, form a part of this specification, and in which—

Figure 1 is a side elevation showing a portion of a side chain and attached cross chains with one of my repair links applied to the side chain.

Fig. 2 is a perspective view showing the repair link during the course of its application to the link of the side chain.

Fig. 3 is a perspective view showing the mode of applying the link to the other link of the chain.

Fig. 4 is a side elevation showing a different form of repair link.

Fig. 5 is an end view of the form shown in Fig. 4, with parts in section, as on the line 5—5 of Fig. 4.

Like numerals of reference indicate like parts in the different views.

Referring to the drawing, 1 designates a portion of a side chain and 2, 2, the cross chains of an anti-skid chain which may be of any of the well-known or approved forms of construction. The links 3 of the side chain when broken cannot be replaced by one of like nature, and to repair the said chain with wire or a link of a substantially different nature gives the chain an unsightly appearance, beside having a tendency to twist the side chain out of shape and cause it to wear the tire. In order to avoid these objections, I make my repair link of substantially the same contour and general appearance as the links of the side chain so that when applied, to replace the broken link, the change will be hardly noticeable.

My improved link 4 is made of substantially the same diameter wire as the link which it is to replace and has the general dimensions and shape of the links of the side chain. Its body portion 5 is of elongated form with the cross portion 6 at one end and at the other end it is formed with the hook members 7, 7, the terminals of which are normally not clenched against the adjacent portions of the link, but are separated therefrom to leave the space 8, as seen in Fig. 2. The hook portion 7 at each side of the link is joined to the adjacent side member of the body of the link by a bend 9 which extends inward toward the corresponding inward bend of the opposite side, as seen in Fig. 2, and an adjacent bend 10 which is downward, as seen best in Fig. 3. This throws the portions of the hooks which are to receive the cross bar of the adjacent link downward so that when engaged the links will lie in substantially the same plane.

In applying the link to replace a broken link of the side chain, the repair link is placed in the position shown in Fig. 2, with one of the hook members 7 engaged in the eye 11 of one of the links 12 of the side chain, as seen in said Fig. 2 in full lines, and then the link 12 is reversed and slid along the under part of the hook member 7 and along the adjacent side portion of the link 4 into the position in which it is shown in dotted lines in said Fig. 2. This places the links 4 and 12 in the position in which they are shown by full lines in Fig. 3. Then the adjacent link 13 of the side chain is placed with its body portion at right angles to the length of the link 4, as shown in full lines in Fig. 3, and the hook members 7 engage in the space between the side bars of the link 13, and then the link 13 is turned into the position shown in dotted lines in said Fig. 3. The hook members 7 of the repair link are then clenched over the cross portion 14 of the link 13, by means of a hammer or a pair of pliers or any convenient device and the side link then appears as seen in Fig. 1. The space between the hook members 7 is made to correspond substantially to the thickness of the eyes 11 of the links of the side chain so that as the said eyes are slipped over one of the said hook members 7 in threading the links together, the two eyes of the link of the side chain will freely pass along through the space between the hook members 7 of the repair link, the two links being positioned at an angle of substantially 90° during such movement.

The clenched ends of the hook members 7 can be re-opened and again clenched as often as desired, and the link will, when applied, not twist out of shape, and, by reason of the inward and downward bends at the hook-end of the link, render it impossible for the clenched end to open during use.

In Fig. 4 I have shown a link of slightly different form, but embodying substantially the same construction as that above described and shown in Figs. 1, 2 and 3. This link 15 has its hook members 16 provided with the inward bends 17 and the downward bends 18 similar to the corresponding bends in the links shown in the other views, except that instead of being upon curved lines, the hook members each have substantially parallel inclined portions 19 and 20 which are joined at the one end by the inclined member 21, as seen clearly in Fig. 4, which extends at substantially a right angle to the members 19 and 20. The link is applied as is the one hereinbefore described and the cross member 22 of the link 13 is engaged in the angular bend 23 of the hook member. The free ends of the hook members of this form of link may be clenched as are the free ends of the hook members in the form shown in Figs. 1, 2 and 3, and in order to provide additional security against opening of the hook members of the link, I may provide a clamping member 24 which is of substantially C-shape, as shown best in Fig. 5, which is engaged over the bends 17 of the link 15 and over the free ends of the hook members. The said free ends of the hook members may be provided with the inward curves or depressions 25, as shown, to receive and more securely hold the clamp member 24, as will be readily understood upon reference to Figs. 4 and 5.

Modifications in detail may be resorted to without departing from the spirit of the invention or sacrificing any of its advantages.

What I claim is:—

1. A repair link for anti-skid chains comprising a wire bent to form a body portion of loop shape with its end portions bent to form hooks with their terminals extending in parallel planes and spaced apart laterally for threading the same with adjacent links of a chain, the said hooks being adapted to be clenched to hold the same against separation after the links are threaded together.

2. A repair link for anti-skid chains, the same comprising an elongated body portion with a transverse member at one end and at the other end provided with hook members substantially parallel with each other and with their terminals extended toward said transverse member and spaced apart laterally for the reception of the eyes of the adjacent link of an anti-skid chain between them.

3. A repair link for anti-skid chains comprising an elongated loop body with a transverse member at one end and at the other end provided with substantially parallel hooks spaced apart laterally for the threading thereof with the eye of an adjacent link, with their terminals extended toward said transverse member, there being inward and downward bends between the hook members and the adjacent side members of the loop body of the link.

4. A repair link for anti-skid chains comprising an elongated loop body with a transverse member at one end and at the other end provided with substantially parallel hooks with their terminals extended toward said transverse member, there being inward and downward bends between the hook members and the adjacent side members of the loop body of the link, each hook member having substantially parallel inclined sides with an intermediate angular bend to receive the transverse member of an adjacent link.

5. A repair link for anti-skid chains comprising an elongated loop body with a transverse member at one end and at the other end provided with substantially parallel hooks with their terminals extended toward said transverse member, there being inward and downward bends between the hook members and the adjacent side members of the loop body of the link, each hook member having substantially parallel inclined sides with an intermediate angular bend to receive the transverse member of an adjacent link, and a clamping member adapted to embrace the terminals of said hooks and the adjacent portions of the body of the link at the inward bends thereof.

6. A repair link for anti-skid chains comprising an elongated loop body with a transverse member at one end and at the other end provided with substantially parallel hooks with their terminals extended toward said transverse member, there being inward and downward bends between the hook members and the adjacent side members of the loop body of the link, each hook member having substantially parallel inclined sides with an intermediate angular bend to receive the transverse member of an adjacent link, and a clamping member adapted to embrace the terminals of said hooks and the adjacent portions of the body of the link at the inward bends thereof, the free ends of said hook members being provided with inward depressions to receive said clamp members.

In testimony whereof I affix my signature.

HARRY A. LENTZ.